Aug. 25, 1936.　　　　B. E. HOUSE　　　　2,051,855
BRAKE
Filed Sept. 13, 1932　　　3 Sheets-Sheet 1
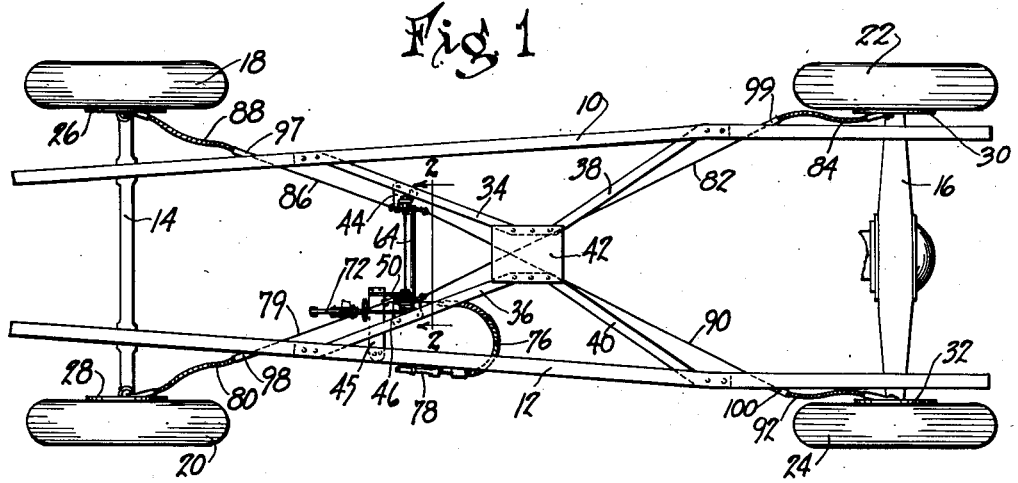
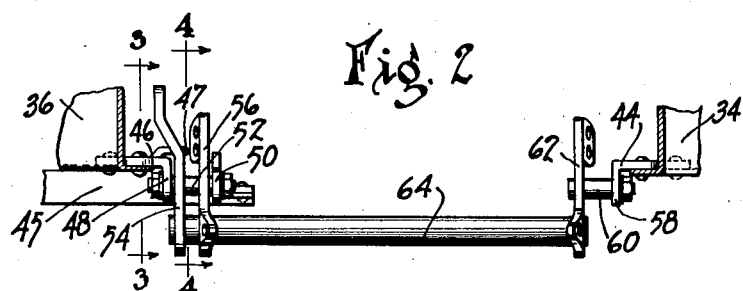
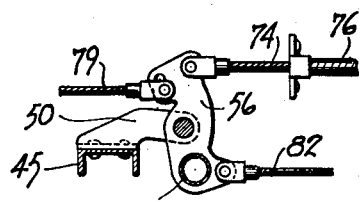
INVENTOR.
Bryan E. House
BY Jerome R. Cox
ATTORNEY Aug. 25, 1936.  B. E. HOUSE  2,051,855
BRAKE
Filed Sept. 13, 1932  3 Sheets-Sheet 2
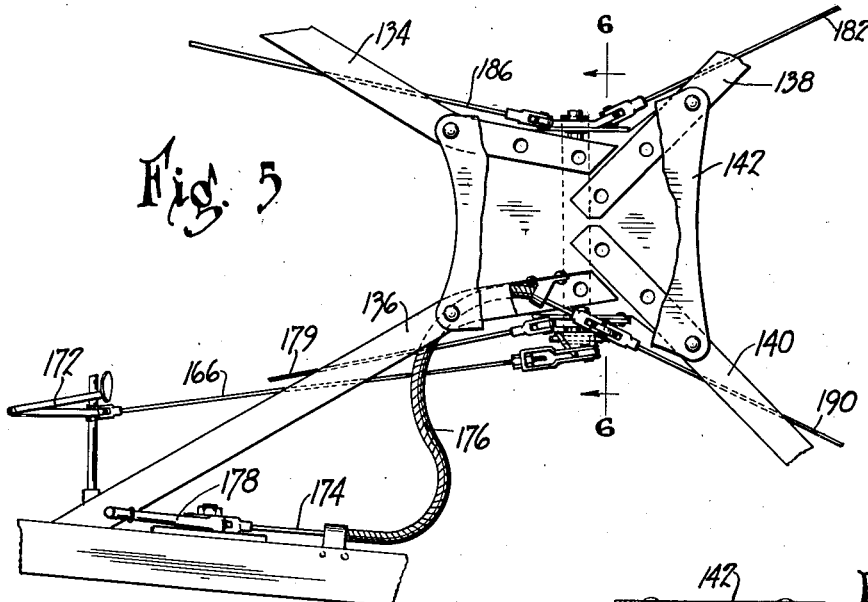
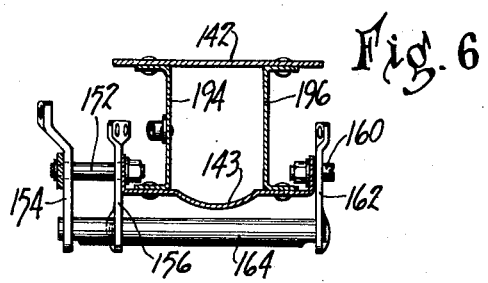
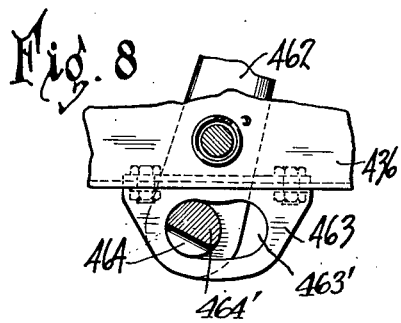
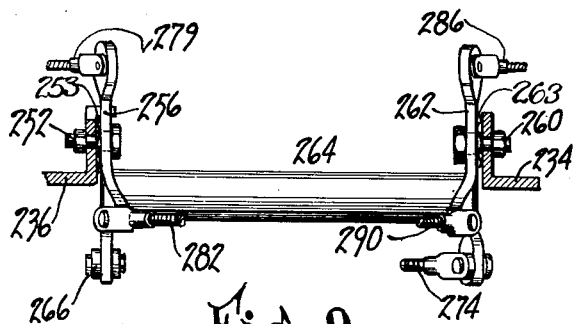
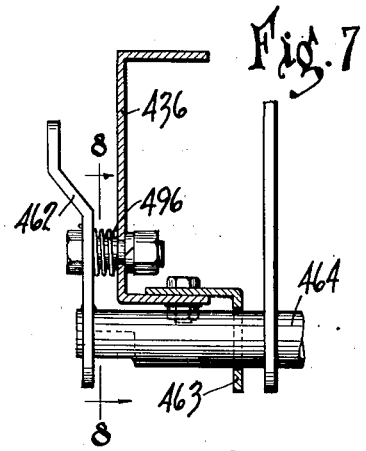
INVENTOR.
Bryan E. House
BY Jerome R. Cox
ATTORNEY.

Aug. 25, 1936.  B. E. HOUSE  2,051,855
BRAKE
Filed Sept. 13, 1932  3 Sheets-Sheet 3
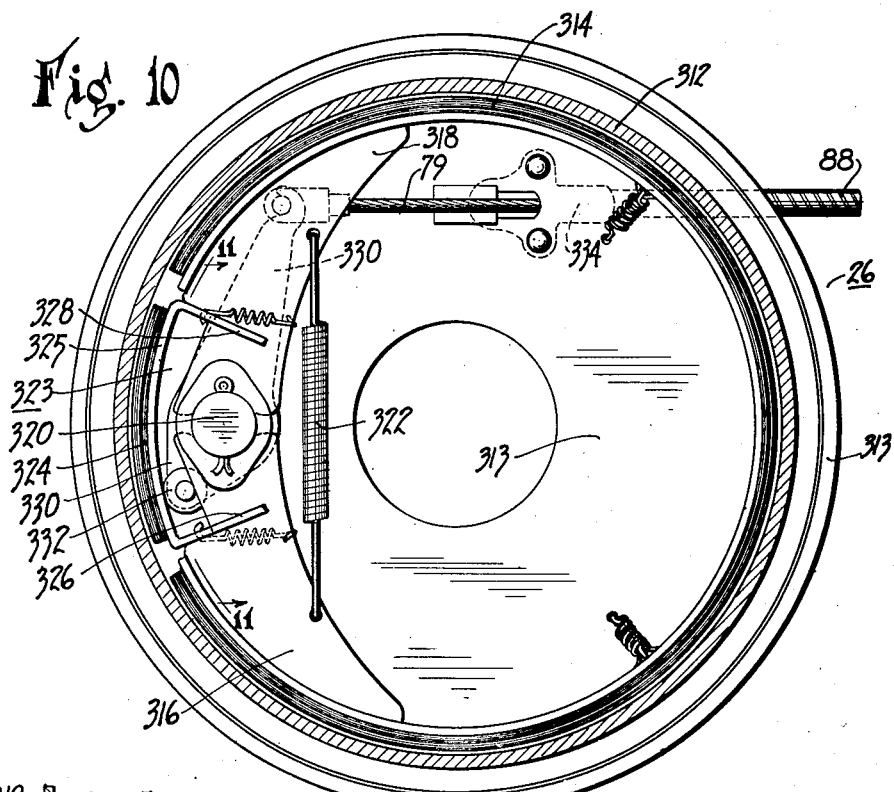
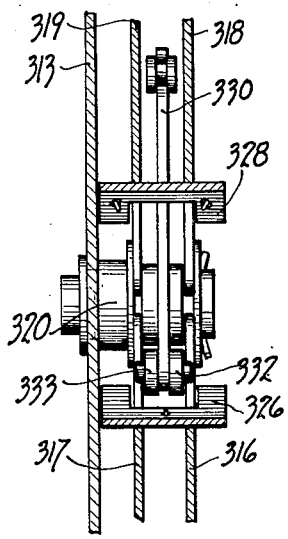
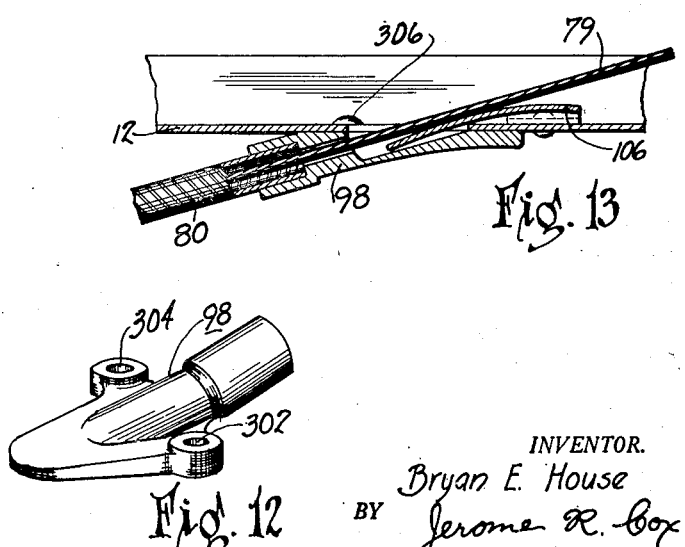
INVENTOR.
Bryan E. House
BY Jerome R. Cox
ATTORNEY.

Patented Aug. 25, 1936

2,051,855

UNITED STATES PATENT OFFICE 2,051,855

BRAKE

Bryan E. House, South Bend, Ind., assignor to Bendix Aviation Corporation, South Bend, Ind., a corporation of Delaware Application September 13, 1932, Serial No. 633,004

13 Claims. (Cl. 188—10)

This invention relates to automotive braking devices and more particularly to means for transmitting brake applying force from an operator actuated member to the brakes.

Most automotive vehicle manufacturers prefer a transmitting system in which a cross shaft is actuated by an operator actuated member or members and in which the force is transmitted from the cross shaft to the brakes by cables which for at least a portion of their length pass through flexible conduits. This preference is based upon considerations of cheapness, safety and compliance with state and national laws.

The cross shaft systems heretofore used have been open to criticism in certain respects. In the event of failure of such shafts, it would usually happen that the only brakes remaining effective responsive to operation of one actuating member would both be on one side of the automobile. Furthermore, the cross shafts have added some weight and cost to the car. The fact that the shafts are relatively long and the resultant relatively large distortion due to frame movement have introduced relatively large errors into the brake hook-up. The attempt to combine cross shaft hook-ups with X-frame members has met with difficulties due to the fact that the X-frame members are of necessity positioned low to the ground. When it is attempted to mount the cross shaft in brackets secured below the X-frame according to the heretofore conventional practice, the lower ends of the lower levers extend too near the ground. An attempt to mount the cross shaft in bearings level with the X-frame members introduces difficulties and relatively great expense in assembly operations.

One of the objects of the invention therefore, is the provision of a cross shaft brake applying system in which in the event of the failure of any portion thereof, competent brakes will be retained nevertheless upon one front brake and upon the opposite rear brake.

A further object is the provision of a cross shaft brake applying system of relatively low cost and weight and of relatively high efficiency.

A further object of the invention is the decrease of the effect of torsional deflection of the frame upon the brake applying means.

A further object of the invention is the provision of a new and improved servo brake.

One of the features of the device disclosed in illustration of the invention is the positioning of a brake operating cross-shaft in a plane spaced vertically from the X-frame of the vehicle, while mounting the shaft pivotally upon a portion of said X-frame.

A further feature of the device illustrated is a lever which serves the triple purpose of (a) supporting the cross-shaft, (b) receiving brake applying force from the pedal or hand lever, and (c) transmitting brake applying force to a front brake and to a rear brake.

A further feature of the device illustrated is a novel safety bracket secured to the frame and formed with an arcual slot.

A further feature of the device is a bracket having a plane face by which it is secured to the frame or to the backing plate and having an inclined bore through which an operating cable may extend.

A further feature of the invention is the mounting of a brake applying lever pivotally upon the anchor for the brake friction element.

Further objects and features of the invention will be apparent after a reading of the subjoined specification and claims and after a consideration of the accompanying drawings in which:

Figure 1 is a plan view of a chassis of an automobile provided with brakes and brake applying means and constructed according to my invention;

Figure 2 is a sectional view taken substantially upon the line 2—2 of Figure 1;

Figure 3 is a sectional view taken substantially on the line 3—3 of Figure 2;

Figure 4 is a sectional view taken substantially on the line 4—4 of Figure 2;

Figure 5 is a fragmentary plan view of a chassis of an automobile disclosing a modified form of brake applying structure;

Figure 6 is a sectional view taken substantially on the line 6—6 of Figure 5;

Figure 7 is a sectional view on an enlarged scale of a portion of a structure similar to that shown in Figure 6 looking in the opposite direction to that of Figure 6;

Figure 8 is a view in side elevation and on an enlarged scale of a fragment of the structure shown in Figure 7.

Figure 9 is a view in section of a modified form of brake applying structure;

Figure 10 is a view in section and on an enlarged scale of one of the brakes shown in Figure 1;

Figure 11 is a view in section taken substantially on the line 11—11 of Figure 10;

Figure 12 is a view in perspective of a bracket adapted to be used on the backing plate as shown in Figure 10 or on the frame as shown in Figure 1; and Figure 13 is a view in horizontal section on an enlarged scale of one of several brackets which are secured to the frame of the vehicle.

Referring in particular to Figure 1 of the drawings, it may be seen that I have shown the chassis of an automobile having side rails 10 and 12, supported by a front axle 14 and rear axle 16, the former being in turn supported by road wheels 18 and 20 and the latter being supported by road wheels 22 and 24. The wheels 18, 20, 22, and 24 are equipped with brakes 26, 28, 30, and 32 respectively.

The side rails 10 are braced and connected by means of an X-frame member which comprises four diagonal rails 34, 36, 38, and 40 and a saddle securing the diagonal rails to each other, the saddle being formed by a pair of parallel plates of which only the upper plate 42 is shown. As shown most clearly in Figure 1 and Figure 2, the rails 34 and 36 are provided with cross shaft support brackets 44 and 46. The bracket 46 is formed with an upwardly bent strip 47 which provides a stop for purposes later to be mentioned. It is also formed with a flange or ear 48 having a hole which forms a bearing for aiding in supporting the pin 52. A channel member 45 secured to the rail 12 and the rail 36 carries a bracket 50 which has a hole forming a bearing for also aiding in supporting the pin 52. Mounted on the pin 52 are a pair of double armed levers 54 and 56 which support the cross shaft. The bracket 44 like the bracket 46 has a downwardly extending ear 58 by means of which it pivotally supports a pin 60, said pin 60 carrying a double armed lever 62 similar to lever 56. The levers 54, 56, and 62 are formed at their lower ends with circular openings through which there extends a cross-shaft 64. The shaft 64 is thus mounted for pivotal movement about the pins 52 and 60 and is suspended beneath the frame formed by the cross-rails 10 and 12 and the diagonal rails 34, 36, 38, and 40. The levers 54, 56, and 62 not only support the cross shaft 64 but also serve to transmit brake applying force from the cross shaft assembly to the cable connected to the brakes. The levers 54, 56, and 62, together with the shaft 64 form a yoke supported by the X-member, the yoke serving to transmit brake applying force to the brakes.

Connected to the upper end of the lever 54 (see Fig. 3) is an adjustable strut 66 provided with a slot 68. A pin 70 passing through the slot 68 connects the strut 66 with a foot pedal 72. Connected to the upper end of the lever 56 (see Fig. 4) is a cable 74 adapted to move through a conduit 76, the cable being connected at its opposite end with the hand lever 78. Also connected with the upper end of the lever 56 is a cable 79 which extends forward and through a conduit 80 to the left front brake 28. Connected to the lower end of the lever 56 is a cable 82 which extends rearwardly and to the opposite side of the car and thence through a conduit 84 to the right rear brake 30. Connected to the upper end of the lever 62 is a cable 86 which extends forwardly through a conduit 88 to the right front brake 26 and connected to the lower end of said lever 62 is a cable 90 extending rearwardly to the opposite side of the car through a conduit 92 to the left rear brake 32. It may be seen that the stop 47 formed on the bracket 46 limits the movement of the brake applying mechanisms forward as the brakes are released.

It may be seen that there are provided brackets 97, 98, 99, and 100 secured to the side rails 10 and 12 and through which the cables 86, 79, 82, and 90 respectively pass. These brackets serve as supports forw the inner ends of the conduits 88, 80, 84, and 92 respectively. Inasmuch as all of these brackets are alike, only one need be described in detail. Bracket 98 is shown more clearly in Figures 12 and 13 and includes a flat faced portion which is adapted to be secured to the side rail 12 by means of bolts such as 306 which may pass through openings such as 302 and 304.

The brakes 26, 28, 30, and 32 are each similar to each other and the description of one will be sufficient for all. The brake 26 comprises a drum 312; a backing plate 313; a brake band 314 positioned in the drum and having secured to the ends thereof double webs such as 316 and 317, and 318 and 319 respectively. These webs 316, 317, 318, and 319 are adapted to anchor upon a pin 320 secured to the backing plate 313. The webs 316 and 318 are connected by means of a spring 322 which serves to return the brake band to its normal released position when the applying force is withdrawn. Interposed between the ends of the band 314 is a brake shoe including a friction element 324 and a rim element 325, having flanges 326 and 328. Pivotally mounted upon the anchor post 320 is a lever 330 which carries at one end rollers 332 and 333. The rollers are adapted to contact with the rim 325 and thus to move the shoe into contact with the drum. The opposite end of the lever 330 is connected to the cable 79. The cable 79 passes through a bracket 334 similar in all respects to the bracket 98 secured to the backing plate 313 and (the cable) then passes through the conduit 80 to its connection with the lever 56. It is clear that any one of many other types of brakes may be employed in lieu of that shown in Figures 10 and 11.

In the operation of the braking system specifically disclosed in Figures 1-4 inclusive and 10-13 inclusive, the operator applies force either to the pedal 72 or the hand lever 78 and thus rotates the levers 54, 56, and 62 together with the cross-shaft 64 about the axis of the pins 52 and 60. This action exerts a tension upon the cables 86, 79, 82, and 90, and through the various levers corresponding to the lever 330 applies the shoes corresponding to the shoe 323 to the rotating drums corresponding to the drum 312. In each case this causes the brake band to be applied to the drum and through its reaction upon the anchor post exerts a retarding influence upon the wheel. Should any part of the braking apparatus fail, the operator still has available either through the foot pedal 72 or through the hand lever 78 two or more brakes. Moreover, the brakes available will be on alternate sides of the vehicle and one at the front end of the vehicle and one at the rear. Due to the short length of the cross shaft 64 and its mounting on the X-frame member, there is little deflection in the braking system due to the distortion of the frame members. Due to the arrangement of the X-frame members, the diagonal braking through the crossing of the cables 82 and 90 is easily arranged.

In the brake applying device shown in Figures 5 and 6, the plates 142 and 143 which connect the diagonal frame members 134, 136, 138, and 140 are secured to each other in spaced relationship by means of channel members 194 and 196. The plate member 143 is provided at opposite sides with a pair of up-turned flanges in which pins 152 and 160 are mounted. The pin 152 carries levers 154 and 156 and the pin 160 carries a lever 162. The lever 156 is formed at its lower end with a circular opening and the levers 154 and 162 are formed at their lower ends with openings shaped as a circle with a segment cut off from one side. These openings are aligned with each other and there extends through them a cross shaft 164. The lever 156 is connected to a hand lever 178 by means of a cable 174 which passes through a conduit 176 and is connected to the left forward brake by means of a cable 179 and to the left rearward brake by means of a cable 190. The lever 154 is connected to a foot pedal 172 by means of a link 166. The lever 162 is connected to the forward right brake by means of a cable 186 and to the right rear brake by means of a cable 182.

As illustrated in Figures 7 and 8, there may be interposed between the web of the diagonal rail 436 and the lever 462 a coil spring 496 which serves to eliminate noise and also aids in returning the cross-shaft 464 (corresponding to shafts 64 and 164) to its normal released position. The shaft 464 is shown with a flattened portion 464' on which the end lever 462 is mounted. Secured to the lower flange of the diagonal rail is a safety bracket 463 formed with an arcual slot 463' as is shown most clearly in Figure 8.

In the embodiment shown in Figure 9, the cross shaft 264 is supported by pins 252 and 260 on upturned flanges formed on diagonal rails 234 and 236 through levers 256 and 262. The upper end of the lever 256 is connected by means of cable 279 with the left front brake and the lower end of the lever is connected through cable 282 with the right rear brake. The lower end of the cable is also connected through a link 266 with a foot pedal similar to foot pedal 72. The upper end of the lever 262 is connected through the cable 286 with the right front brake, and the lower end thereof is connected through cable 290 with the left rear brake. The lower end of the lever 262 is also connected by means of cable 274 with a hand lever similar to the hand lever 78. Interposed between the flanges of the rails 234 and 236 and each of their associated levers 262 and 256 are flat springs 263 and 253 which eliminate excessive play and noise.

In the modifications shown in Figures 5–8 inclusive, the cross-shaft being mounted upon X-frame is of even shorter length than that shown in Figures 1–4 inclusive. Consequently, distortion due to frame distortion is more nearly completely eliminated. In these modifications, the rear cables are not crossed, but in all other respects the operation thereof is similar to the operation of the first modification described. An additional safety measure is provided by reason of the safety brackets 463 which prevent un-limited movement of the shaft 164 in the event of breakage of any of the parts.

In the modification shown in Figure 9, the brakes are operated in exactly the same manner as that of the previous modifications shown. However, due to the fact that the pedal is connected to the lever 256 and the fact that the hand lever is connected to the lever 262, it is only necessary to provide the two levers 256 and 262 to support the cross-shaft 264.

It is to be understood that the above described embodiments of my invention are for the purpose of illustration only and various changes may be made therein without departing from the spirit and scope of the invention.

I claim:

1. In an automotive vehicle, brakes, a frame, a cross shaft supported by said frame and which has a turning movement and also a bodily movement fore and aft of the vehicle, a lever secured to said cross shaft, a cable connected to said lever and to one rear brake, and another cable connected to said lever and to the opposite front brake.

2. In an automotive vehicle, a frame including an X-member, wheels supporting said frame, a cross shaft supported by said X-member for turning movement combined with bodily swinging movement below said X-member, brakes for the wheels of said vehicle, and four operating connections extending from said cross shaft along the respective arms of the X-member to said brakes.

3. In an automotive vehicle, a frame including an X-member, wheels supporting said frame, a cross shaft supported by said X-member, brakes for the wheels of said vehicle, and four operating connections comprising a plurality of crossed cables extending from said cross shaft along the respective arms of the X-member to said brakes.

4. In an automotive vehicle, a frame including side members connected by an X-member, wheels supporting said frame, a cross shaft, a pair of levers pivoted on said X-member and supporting said cross shaft below said X-member for bodily swinging movement relatively thereto, brakes for the wheels of said vehicle, and four operating connections extending from said levers along the respective arms of the X-member to said brakes.

5. In an automotive vehicle, a frame, a pair of levers pivotally mounted upon said frame, a cross shaft suspended beneath said frame upon said levers, wheels for said vehicle, brakes for said wheels, an operating connection secured to one of said levers and connected to one of said brakes, another operating connection secured to the other lever and connected to another of said brakes, a manually operable lever, and a connection extending between said manually operable lever and one of said first named levers.

6. In an automotive vehicle, a frame, a pair of levers pivotally mounted upon said frame, a cross shaft suspended beneath said frame upon said levers, wheels for said vehicle, brakes for said wheels, an operating connection secured to one of said levers and connected to one of said brakes, another operating connection secured to the other lever and connected to another of said brakes, a manually operable lever, a connection extending between said manually operable lever and one of said first named levers, another manually operable lever, and a connection between said second manually operable lever and the other of said first mentioned suspending levers.

7. In an automotive vehicle a frame including a plurality of members arranged to form an X-brace, a plurality of plates secured to said X-members and forming a saddle therefor and having vertical flanges, vertical levers pivoted on said flanges at opposite sides of said X-brace and a cross shaft below said X-brace rigidly connecting said levers.

8. In brake applying structure for an automotive vehicle for use in combination with a backing plate for a brake having an operating cable, a bracket formed with a flat face by which it may be attached to said backing plate, and provided with a pair of holes perpendicular to said flat face, and having an inclined tubular portion formed with a bore inclined to said flat face through which said cable may pass, and means passing through said holes by which the bracket is secured to said backing plate.

9. In an automotive vehicle a frame comprising a pair of side rails, a pair of diagonal rails secured to each of the side rails one at a point near the rearward end of each side rail and one at a point near the forward end of each side rail and all extending inward to a point adjacent to the center of the vehicle, a saddle secured to all of the said diagonal rails for joining them to each other, levers pivoted on said diagonal rails opposite each other, and a cross shaft rigidly connecting said levers and swinging bodily below said diagonal rails.

10. In an automotive vehicle a frame comprising a pair of side rails, a pair of diagonal rails secured to each of the side rails one at a point near the rearward end of each side rail and one at a point near the forward end of each side rail and all extending inward to a point adjacent to the center of the vehicle, a saddle secured to all of said diagonal rails for joining them to each other, vertical levers independently pivoted at opposite sides of said saddle, and a shaft rigidly connecting said levers and swinging bodily fore and aft below said saddle.

11. In an automotive vehicle, a frame, a cross shaft associated with said frame, a pair of levers for pivotally suspending said cross shaft beneath said frame, a pin passing through a portion of said frame and through one of said levers for pivotally securing said levers to said frame, and a spring surrounding said pin and interposed between said frame and said lever.

12. In an automotive vehicle brakes, a frame, a cross shaft, a lever pivotally supported on said frame and supporting said cross shaft, a cable connected to said lever and to one rear brake, and another cable connected to said lever and to the opposite front brake.

13. In a mechanism for operating four wheel brakes of an automotive vehicle, a cross shaft, a lever secured to each end of said cross shaft, a pair of connections secured to each of said levers an extending relatively to two of said brakes and an operating connection also secured to each of said levers.

BRYAN E. HOUSE.